US009757662B2

(12) United States Patent
Bruinsma et al.

(10) Patent No.: US 9,757,662 B2
(45) Date of Patent: Sep. 12, 2017

(54) HEAT INTEGRATED DISTILLATION COLUMN USING STRUCTURED PACKING

(75) Inventors: Odolphus Simon Leo Bruinsma, Schagen (NL); Markus Friedrich Fischer, Constance (DE)

(73) Assignee: Stichting Energieonderzoek Centrum Nederland, Petten (NL)

( * ) Notice: Subject to any disclaimer, the term of this patent is extended or adjusted under 35 U.S.C. 154(b) by 876 days.

(21) Appl. No.: 13/980,289

(22) PCT Filed: Jan. 12, 2012

(86) PCT No.: PCT/NL2012/050018

§ 371 (c)(1),
(2), (4) Date: Sep. 25, 2013

(87) PCT Pub. No.: WO2012/099463

PCT Pub. Date: Jul. 26, 2012

(65) Prior Publication Data

US 2014/0008207 A1 Jan. 9, 2014

(30) Foreign Application Priority Data

Jan. 18, 2011 (NL) ..................................... 2006022

(51) Int. Cl.
*B01J 8/00* (2006.01)
*B01D 3/32* (2006.01)
*B01D 3/14* (2006.01)
*B01J 19/32* (2006.01)
*F28D 9/00* (2006.01)

(52) U.S. Cl.
CPC ................. *B01D 3/32* (2013.01); *B01D 3/14* (2013.01); *B01J 19/32* (2013.01); *F28D 9/0012* (2013.01); *F28D 9/0062* (2013.01); *B01J 2219/3221* (2013.01); *B01J 2219/3222* (2013.01); *B01J 2219/32206* (2013.01); *B01J 2219/32227* (2013.01); *B01J 2219/32251* (2013.01); *B01J 2219/32262* (2013.01)

(58) Field of Classification Search
CPC ................................... B01D 3/14; B01D 3/16
USPC ................................. 422/610, 608; 202/158
See application file for complete search history.

(56) References Cited

U.S. PATENT DOCUMENTS

| | | | |
|---|---|---|---|
| 3,498,372 A | 3/1970 | Patten et al. | |
| 4,715,431 A | 12/1987 | Schwarz et al. | |
| 5,718,127 A | 2/1998 | Aitken | |
| 5,968,321 A | 10/1999 | Sears | |
| 6,206,349 B1 | 3/2001 | Parten | |
| 2004/0200602 A1 * | 10/2004 | Hugill ...................... | B01D 3/14 165/110 |

FOREIGN PATENT DOCUMENTS

| | | |
|---|---|---|
| GB | 0 788 193 A | 12/1957 |
| GB | 0 824 354 A | 11/1959 |
| GB | 1 079 533 A | 8/1967 |
| GB | 2 035 831 A | 6/1980 |
| JP | 55-012348 A | 1/1980 |
| JP | 10-122770 A | 5/1998 |
| WO | WO-03/011418 A1 | 2/2003 |

OTHER PUBLICATIONS

International Search Report received in PCT/NL2012/050018 dated Mar. 30, 2012.

* cited by examiner

*Primary Examiner* — Natalia Levkovich
(74) *Attorney, Agent, or Firm* — Gilberto M. Villacorta; Sunit Talapatra; Foley & Lardner LLP

(57) ABSTRACT

Heat integrated distillation column for separating components in a fluid mixture. The heat integrated distillation column is provided with a stripper part (S), a rectifier part (R) and a compressor (2) between the stripper part (S) and the rectifier part (R). Furthermore, a heat exchange assembly for transferring heat between the stripper part (S) and the rectifier part (R), and a mass transfer assembly for condensation and vaporization in the heat integrated distillation column are provided. The stripper part (S), the rectifier part (R), or the stripper part (S) and rectifier part (R), comprise a channel formed by adjacent channel assemblies (6), each forming a structural part of the heat integrated distillation column and a functional part of the heat exchange assembly and of the mass transfer assembly. A plate (8) and a structured packing in the form of two or more corrugated plates (7) are provided.

9 Claims, 4 Drawing Sheets

HEAT INTEGRATED DISTILLATION COLUMN USING STRUCTURED PACKING

CROSS-REFERENCE TO RELATED APPLICATIONS

Figure 1:
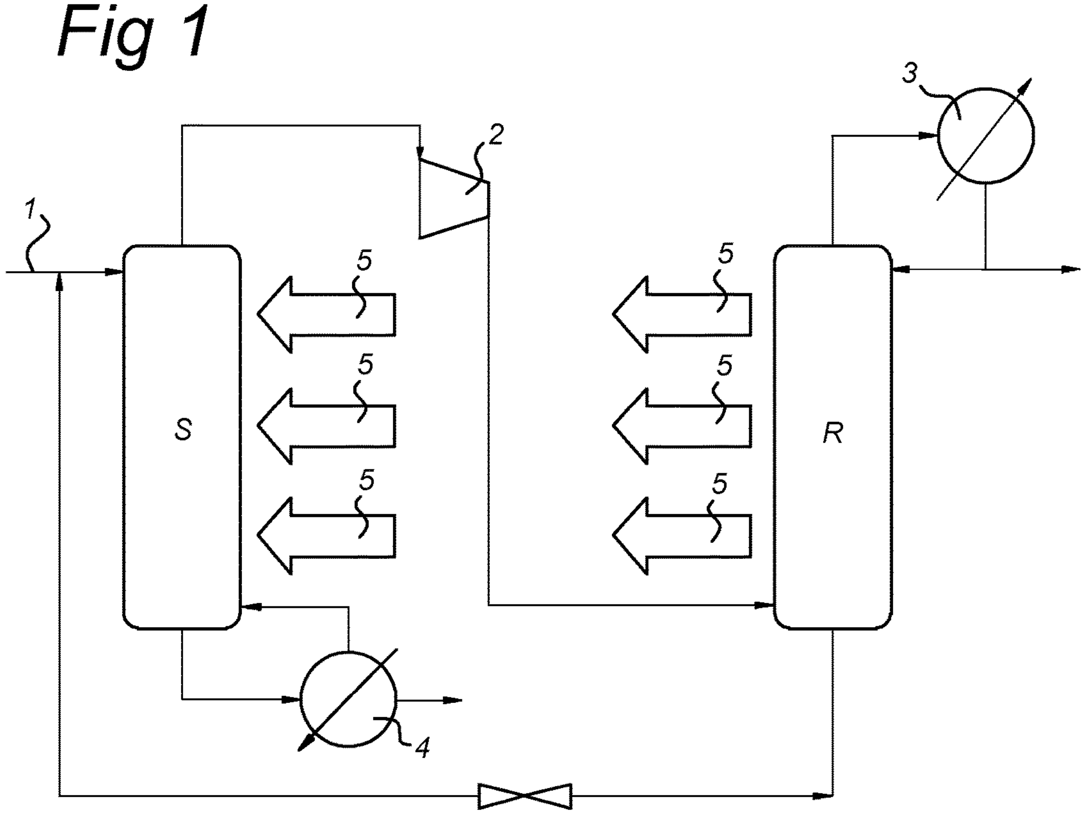

This application is the National Phase of International Patent Application No. PCT/NL2012/050018, filed Jan. 12, 2012, published as WO 2012/099463, which claims priority to Netherlands Application No. 2006022, filed Jan. 18, 2011. The contents of these applications are herein incorporated by reference in their entirety.

FIELD OF THE INVENTION

The present invention relates to a heat integrated distillation column for separating components in a fluid mixture, the heat integrated distillation column comprising a stripper part, a rectifier part and a compressor between the stripper part and the rectifier part, and a heat exchange assembly for transferring heat between the stripper part and the rectifier part, and a mass transfer assembly for condensation and vaporization in the heat integrated distillation column.

PRIOR ART

International patent publication WO03/011418 discloses a heat integrated distillation column for stripping an rectifying a fluid mixture. The stripper section and rectifier section comprise multiple channels, wherein a channel for the stripper section and a channel for the rectifier section alternate. The channels are formed by a number of adjacent plates which provide the heat exchange function. Meandering fins are positioned inside the adjacent plates to allow condensate to form thereon in the rectifier section and to allow vapor to be formed in the stripper section, and to collect condensate at the bottom of the channels and the vapor at the top of the channels.

American patent publication U.S. Pat. No. 5,718,127 discloses a liquid vapor contact apparatus, including pairs walls with a packing in between. The packing is in the form of a vertical array of corrugated contact elements (of which the corrugation direction may alternate in vertical direction as shown in FIG. 2). In the assembled apparatus, there is always a plate 8 between a single layer of corrugated material 12. This is not a heat integrated distillation column as heat transfer between compartments is not considered.

American patent publication U.S. Pat. No. 4,715,431 discloses a reboiler-condensor with enhanced surfaces. As prior art for this document, devices in the class of a plate-fin type of distillation column are mentioned. This specific invention relates to further modification of the internal surfaces of the apparatus. This is not a heat integrated distillation column as separation is not considered. Some of the channels are horizontal and clearly only meant for heat transfer.

Japanese patent publication JP-55-012348 discloses a cylindrical type of heat exchanger, wherein a single corrugated sheet F is included between two adjacent walls 4, 5. This is not a heat integrated distillation column as separation is not considered.

SUMMARY OF THE INVENTION

The present invention seeks to provide a more efficient heat integrated distillation column, especially with an improved mass transfer capacity.

According to the present invention, a heat integrated distillation column according to the preamble defined above is provided, wherein the stripper part, the rectifier part, or the stripper part and rectifier part, comprise a channel formed by two or more adjacent channel assemblies, each channel assembly forming a structural part of the heat integrated distillation column and a functional part of the heat exchange assembly and of the mass transfer assembly, wherein the channel assembly comprises a plate and a structured packing in the form of two or more corrugated plates having a corrugation direction, wherein the two or more corrugated plates in the channel face each other and the corrugation directions of the facing corrugated plates cross each other.

The channel assemblies form the flow channels for the stripper part, rectifier part, or both. As the channel assembly is a structural part of the heat integrated distillation column (HIDiC), it is possible to easily and efficiently form an entire HIDiC, e.g. by a combination of a plurality of channel assemblies in parallel, or in sections on top of each other. The channel assembly also forms a functional part of both the heat exchange assembly and the mass transfer assembly at the same time, providing a more efficient build of the HIDiC. A structured packing as such is well known in the processing industry. The resulting channel assembly provides a good balance between heat transfer and mass transfer capacities. A channel is formed between two adjacent channel assemblies, which adjacent channel assemblies are mirrored. This allows the corrugated plates to form multiple contact points, allowing condensate also to flow from one side of the channel to the other, thereby enhancing the efficiency of mass transfer. In a further embodiment, a contact sheet is provided between two adjacent channel assemblies, e.g. in the form of a perforated plate or a wire mesh (gauze), which enables contact bridges to be formed.

In an embodiment, the channel assembly comprises components made of a heat transfer material, such as metal (e.g. steel), one of the components being the two or more corrugated plates being formed to allow condensation on the surface of the material or to allow vaporization from the surface of the material. This material can thus be used for both functions of the HIDiC.

The channel assembly has a density or weight of less than 1500 kg/m$^3$, e.g. less than 1000 kg/m$^3$ in a further embodiment. In further examples the density is e.g. in the range of 300-500 kg/m$^3$. This is allowed by the structure of the channel assembly, and is much lighter compared to prior art systems.

The structured packing comprises a series of at least two corrugated plates positioned along a longitudinal direction of the heat integrated distillation column in a further embodiment. Subsequent corrugated plates have different corrugation orientations. This provides an elongated path for condensation, and also provides better contact possibilities for vaporization and mass transfer, thus enhancing the function of the channel assembly in the HIDiC. In an embodiment, the different corrugation orientations are symmetrical with respect to the longitudinal direction. In a further embodiment, the orientations are at an angle of more than 15° with respect to the longitudinal direction. Furthermore, the structured packing may comprises a material provided with a plurality of indentations, such as dimples or small grooves, enlarging the effective surface of the structured packing.

Multiple channel assemblies are provided positioned in parallel along a longitudinal direction of the heat integrated distillation column in a further embodiment, in order to provide a higher capacity for processing.

In a further embodiment, one of the stripper part and rectifier part comprises a plurality of (e.g. cylindrical) channel assemblies positioned concentrically, the space between the plurality of cylindrical channel assemblies forming the other one of the stripper part and rectifier part. Cylindrical embodiments of processing plant components are regularly used, and provide a more uniform processing environment across the channels formed.

The heat integrated distillation column in a further embodiment comprises an envelope housing surrounding the rectifier part and stripper part. In both rectangular and circular cross section embodiments, this allows to properly seal off the stripper and rectifier part from the environment.

SHORT DESCRIPTION OF DRAWINGS

Figure 2A:
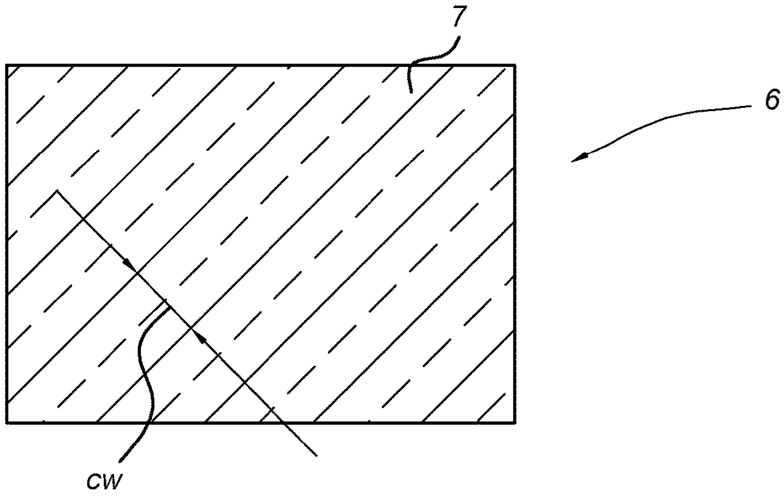
Figure 2B:
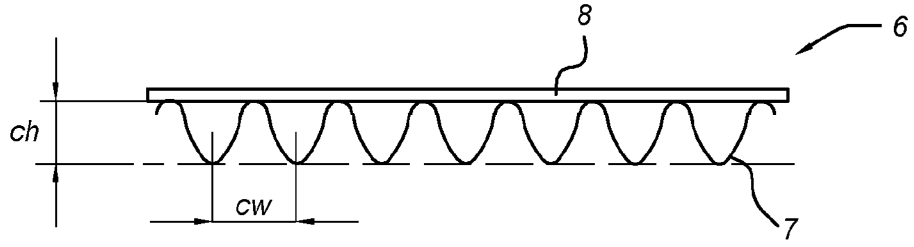

The present invention will be discussed in more detail below, using a number of exemplary embodiments, with reference to the attached drawings, in which FIG. 1 shows a schematic diagram of a heat integrated distillation column;

FIG. 2*a* shows a frontal view of a channel assembly according to an embodiment of the present invention;

FIG. 2*b* shows a cross sectional view of the channel assembly of FIG. 2*a;*

Figure 3:
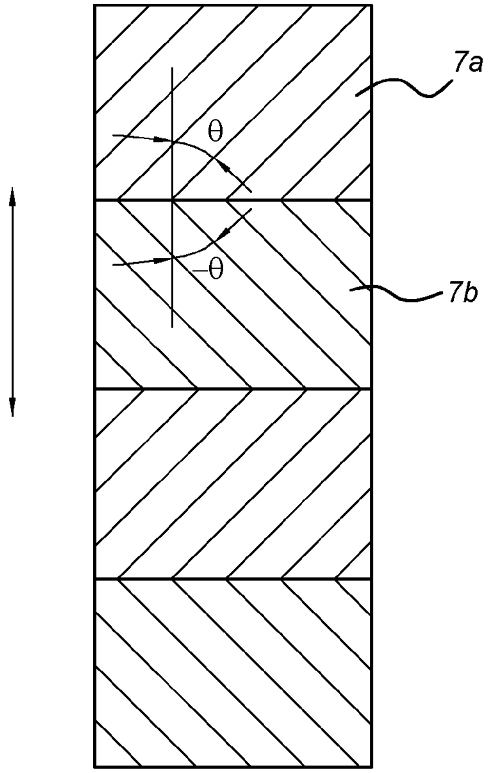
Figure 4A:
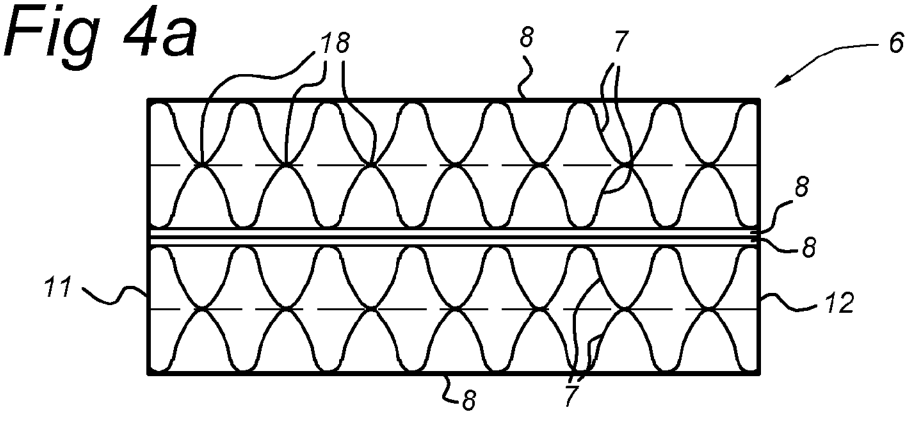
Figure 4B:
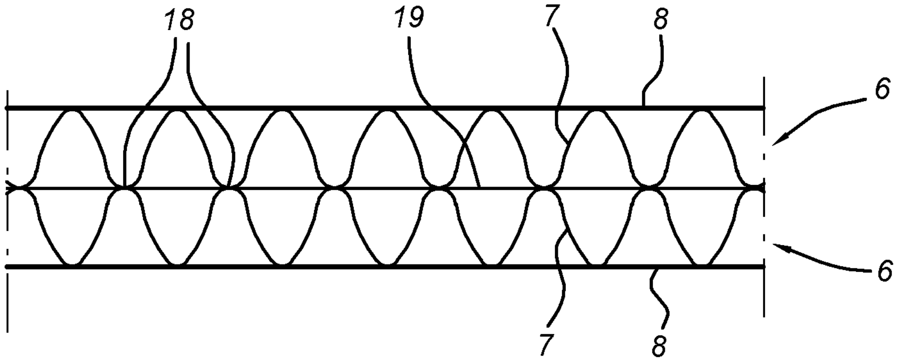

FIG. 3 shows a frontal view of a channel assembly according to a further embodiment of the present invention;

FIG. 4*a* shows a cross sectional view of a plurality of channel assemblies forming channels for a HIDiC;

FIG. 4*b* shows a cross sectional view of a channel for a HIDiC in an alternative embodiment of FIG. 4*a;*

Figure 5:
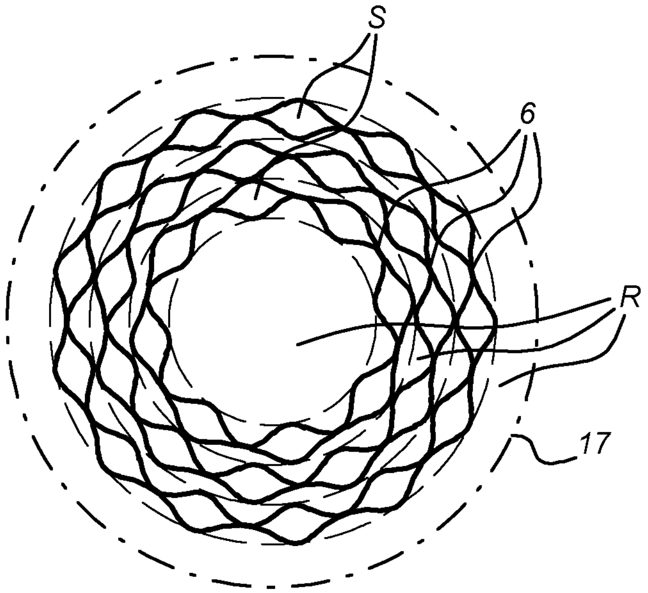
Figure 6:
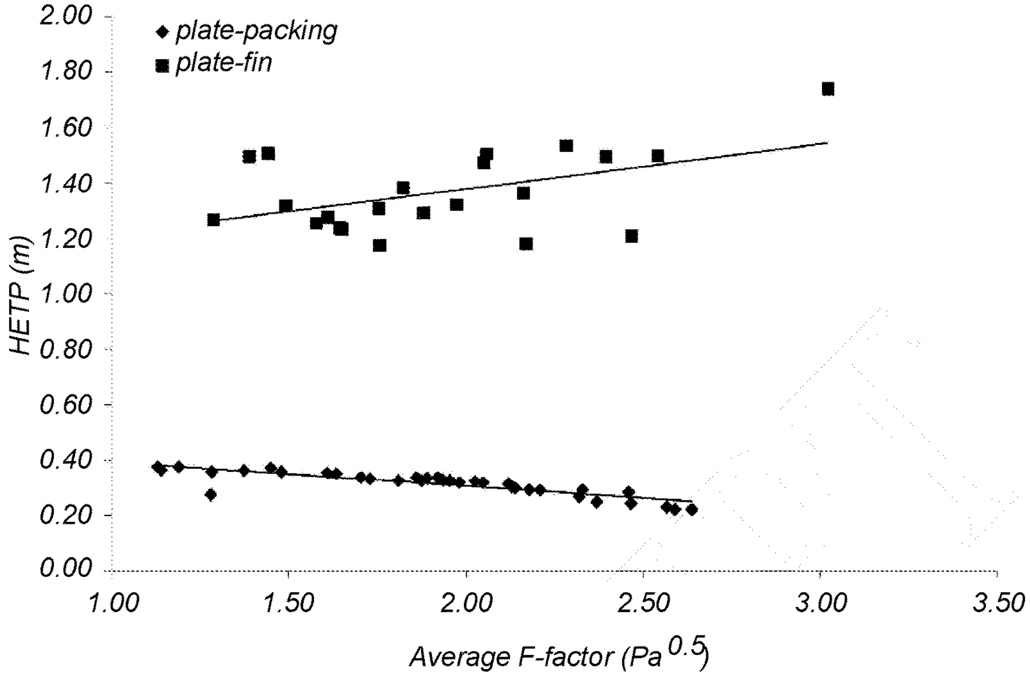
Figure 7:
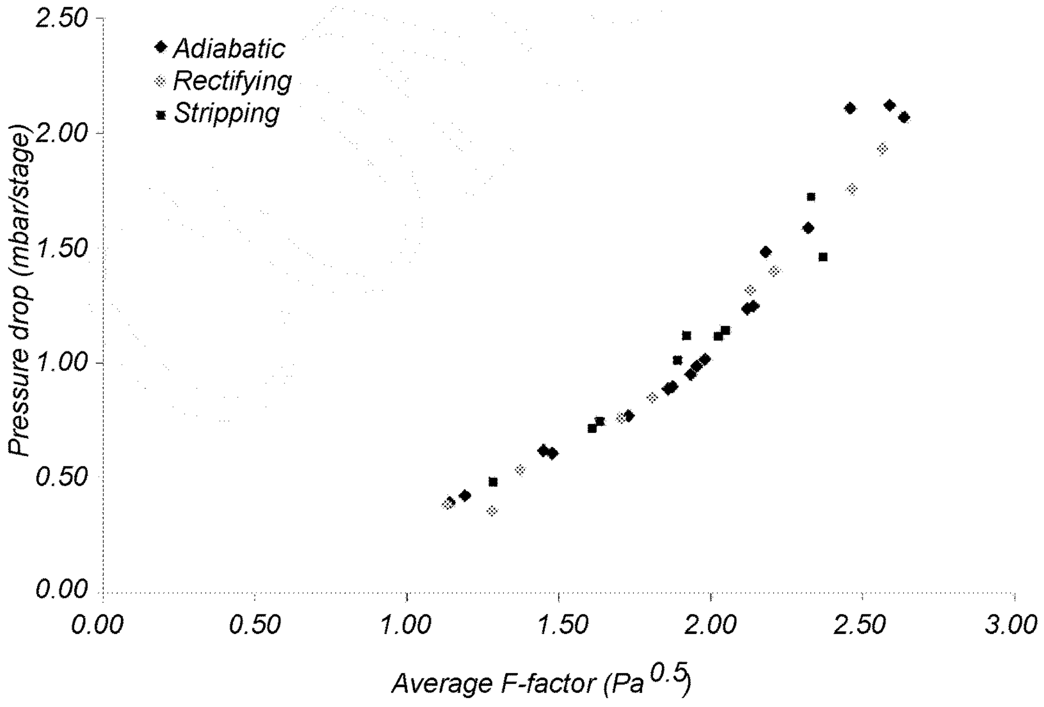

FIG. 5 shows an alternative combination of multiple channel assemblies to form channels of a HIDiC;

FIG. 6 shows a graph in which HETP (height equivalent to a theoretical plate) is plotted as function of the Average F-factor for both a conventional (plate-fin) type of HIDiC and for a plate-packing type of HIDiC according to an embodiment of the present invention; and FIG. 7 shows a graph in which the pressure drop is plotted as function of the F-factor for several embodiments of the HIDiC according to the present invention.

DETAILED DESCRIPTION OF EXEMPLARY EMBODIMENTS

Over the years a number of distillation energy saving technologies have been developed. In conventional distillation columns the energy supplied to a reboiler and extracted in a condenser is lost. In a vapor recompression column (VRC), introduced in the 1980's, a compressor is used as a heat pump to raise the temperature of the top vapor such that it can be used as heating medium for the reboiler. Energy savings are 50-80%, but the maximum temperature lift is economically limited to 30° C., or to about 15% of the installed distillation columns of interest.

A method for separating two components in a fluid is shown diagrammatically in FIG. 1. A mixture (fluid) to be separated is fed to a stripper part S at 1. A gaseous product is fed via a line to a compressor 2 and fed to a rectifier part R. The liquid product (condensate) produced in this rectifier part R is returned to line 1. Vapor from the top of the rectifier part R is fed to an external condenser 3. Liquid that is produced in stripper part S (condensate) is fed from an outlet at the bottom to a reboiler 4, and then partially discharged as a bottom (output) product. The heat transfer from the rectifier part R to the stripper part S is indicated by the arrows 5. It will be understood that it is important to allow this heat transfer to take place as efficiently as possible. According to the present invention embodiments this is achieved by direct heat transfer between the stripper part S and rectifier part R. A system employing such a separation method is also known in the field as a heat integrated distillation column (HIDiC).

In a heat integrated distillation column (HIDiC) the temperature rise over the compressor is only half the value of the temperature difference over the distillation column; thus the compressor power for a HIDiC is typically 50% of that for the VRC. Conventional so-called concentric tray HIDiC columns (see e.g. US patent publication U.S. Pat. No. 7,678,237) have complex and expensive internals and therefore are economically only superior to the VRC in the temperature lift range 20-45° C. These columns are generally limited by heat transfer.

Also a plate-fin configuration (PF-HIDiC) of a heat integrated distillation column is known, as e.g. described in international publication WO03/011418. This type of HIDiC has a number of drawbacks, including but not limited to:

- PF-HIDiC's do not have good separation properties as a consequence of the straight and open channels that result in a low liquid holdup and a high sensitivity to maldistribution;
- PF-HIDiC's have thousands of parallel channels that require a major effort for the distributors;
- A PF-HIDiC is heavy and therefore expensive;
- PF-HIDiC's are difficult to manufacture and can only be made in smaller modules, which do not have the required capacity for bulk distillation processes;
- Most PF-HIDiC's are made of aluminium, a material that is incompatible with many distillation columns.

The present invention embodiments, as described below, relate to a heat integrated distillation column (HIDiC) acting as a micro-structured separator which combines efficient heat transfer properties of known heat exchange implementations and efficient mass transfer (separation) properties associated with structured packing.

In an embodiment of the present invention, a heat integrated distillation column (HIDiC) is provided for separating components in a fluid mixture. The HIDiC comprises, as shown in the schematic view of FIG. 1, a stripper part S, a rectifier part R and a compressor 2 between the stripper part S and the rectifier part R. A heat exchange assembly is provided for transferring heat between the stripper part S and the rectifier part R, indicated by the arrows 5 in FIG. 1. The stripper part S, the rectifier part R or both the stripper part S and rectifier part R, comprise a channel assembly 6. The channel assembly 6 forms a structural part of the heat integrated distillation column and a functional part of the heat exchange assembly and of a mass transfer assembly which allows formation of vapor in the stripper part S, and condensate in the rectifier part R.

In other words the channel assembly 6 takes the form of a structural element for the entire HIDiC, e.g. by providing a separation between the stripper part S and rectifier part R, and at the same time also performs various functions in the HIDiC including a heat transfer function and mass transfer function.

By combining such structural and functional parts in the channel assembly 6, a more energy efficient and cost efficient HIDiC can be provided.

The HIDiC is furthermore provided with collectors, distributors, input/output connectors, valves and the like in order to obtain the fluid mixture flow as discussed with reference to FIG. 1.

In one embodiment, the channel assembly 6 comprises components made of a heat transfer material, such as a metal material, one of the components being a channel part being formed to allow condensation on the surface of the material and/or vaporization from the surface of the material, depending on which part of the HIDiC the channel assembly 6 is present. Thus, the channel assembly 6 provides both the functionality of heat transfer (arrows 5 in FIG. 1) and of mass separation in the HIDiC. The use of e.g. steel as material provides additional benefits as e.g. aluminum which is often used in PF-HIDiC systems, as steel is in most cases better withstanding the substances in the HIDiC in operation.

In a further embodiment, the channel assembly 6 has a density or weight of less than 1500 kg/$m^3$, e.g. less than 1000 kg/$m^3$, i.e. much less than a known plate-fin type HIDiC which has a density in the order of 2000-4000 kg/$m^3$. In exemplary examples of a HIDiC according to the present invention, a weight of between 300-500 kg/$m^3$ has been used.

In a group of further embodiments, the channel assembly comprises a combination of a plate and a structured packing (Plate-Packing HIDiC or PP-HIDiC). The combination of these components forms the structural and functional part as discussed above.

FIG. 2*a* shows a front view of a corrugated plate or sheet 7 being a part of the structured packing as used in the present invention embodiments. The structured packing is formed by a corrugated (metal) plate 7 having a corrugation width of cw, e.g. in the order of 1-3 cm. The direction of the corrugations is at an angle to a side of the corrugated plate 7.

FIG. 2*b* shows a cross sectional view of a channel assembly 6, which shows a height ch of the corrugated plate 7, typically in the order of 0.5-2 cm. The corrugated plate 7 has a plate like orientation, and is combined with a plate 8 parallel to the corrugated plate 7. As seen in the cross sectional view, the channel assembly 6 seen from above always involves material of the structured packing (set of one, two or more parallel oriented corrugated plates 7, especially with crossing corrugation directions), which can be exploited in a HIDiC for forming a large surface for mass transfer functionality. Two of the channel assemblies 6 as shown in FIG. 2*b* may be positioned in parallel, the sides with the corrugated plate 7 facing each other, in order to form a flow channel for the stripper part S, rectifier part R, or both. To obtain as much mass transfer capacity as possible, the corrugation directions of adjacent corrugated plates 7 are crossing.

In one embodiment, the channel assembly 6 comprises a structured packing, e.g. in the form of a series of at least two corrugated (e.g. metal) plates 7 positioned along a longitudinal direction of the heat integrated distillation column, wherein subsequent corrugated plates have different corrugation orientations. This elongates the effective channel length in the HIDiC, allowing to provide a distillation column with a shorter length than usual.

An example of such an embodiment is shown in FIG. 3, where a module having four corrugated plates 7 in the longitudinal direction of the HIDiC (indicated by the double arrow) are provided. A first corrugated plate 7*a* has a corrugation direction at an angle θ with the longitudinal direction of the HIDiC, and the next corrugated plate 7*b* has a corrugation direction at an angle −θ.

In the embodiment shown in FIG. 3, the different corrugation orientations are symmetrical with respect to the longitudinal direction. As a result, less complex collection or redistribution devices or arrangements are needed at the sides of the channel assembly, and the fluid flows are able to be distributed over the entire surface of the channel assembly 6. In a specific embodiment, the corrugation orientations are at an angle θ of less than 60°, and more than 15°, e.g. 30° with respect to the longitudinal direction.

In the top view shown in FIG. 4*a* it is shown that the channel assembly 6 can be used to form complete channels for either the stripper part S, or rectifier part R. In the embodiment shown, two adjacent channel assemblies 6 as shown in FIG. 2*b* are combined (with side plates 11 and 12) to form a single channel. Two channels are shown in FIG. 4*a*, but more channel assemblies 6 can be used to provide multiple channels to increase the throughput of the HIDiC. Thus each channel is formed (seen from the top of the channel, or in cross section) by two or more structured packings, each being formed by a set of adjacent, mirrored corrugated plates 7 and being positioned adjacent to each other, and two plates 8, each forming a structural part for the channel at the outside of the two corrugated plates 7.

As an alternative, a channel assembly 6 may be provided having a plate 8 and a structured packing comprising two or more adjacent corrugated plates 7. These channel assemblies 6 may be arranged side by side, forming channels for the stripper part S, rectifier part R, or both the stripper part S and rectifier part R. In this case only a single plate 8 is present to divide the adjacent channels. Alternatively, two adjacent plates 8 can be used, as shown in the embodiment of FIG. 4*a*).

In an embodiment, the corrugated plates 7 are mirrored, i.e. the corrugation directions of the facing corrugated plates 7 cross each other. This provides an efficient manner to increase the surface of the material of the corrugated plates 7 to contact the fluid flow in the stripper part S or rectifier part R, thereby increasing the mass transfer efficiency.

Furthermore, this provides a plurality of contact points 18 (see FIG. 4*a*) which allow fluid condensed on one of the corrugated plates 7 to cross over to the surface of the other corrugated plate 7. As shown in the embodiment of FIG. 4*b*, this effect may be enhanced using a contact sheet 19. The contact sheet 19 may be a metal plate, a wire mesh, etc. The contact sheet 19 furthermore enhances the structural stability of the combination of two adjacent channel assemblies 6.

In further embodiments, the structured packing comprises a material provided with a plurality of indentations (e.g. in the form of dimples or grooves), which enlarge the effective surface for the condensation and vaporization function in the channel assembly. This effect can be further enhanced using perforations in the material. As an example, the corrugated material used for the structured packings commercially obtainable from Sulzer Chemtech may be used in the present embodiments.

In the embodiment described above, the channel assemblies 6 may be positioned inside an envelope housing, which provides a sufficient sealing of the stripper and rectifier channels in the HIDiC. The envelope housing may be rectangular, but it may also be provided in a circular or other shape. The circular shape will have the advantage that the process conditions may be better controlled.

For all embodiments of the channel assembly 6 as described above, it is possible to form channels for the stripper part S, rectifier part R or both. Multiple channel assemblies 6 are provided in a further embodiment, positioned in parallel along a longitudinal direction of the heat integrated distillation column. This increases the capacity of the HIDiC to a desired level for a specific application. Also, scaling up from a laboratory test version to a full scale production version of the HIDiC is easily achieved.

In a further embodiment, adjacent ones of the multiple channel assemblies 6 are mirrored, thereby forming the desired pattern of channels for either the stripper part S, rectifier part R, or both.

In an alternative embodiment of the HIDiC the channel assemblies 6 are used to form concentric annular channel patterns, as shown in the embodiment of FIG. 5. The HIDiC in this embodiment optionally comprises an envelope housing 17 (indicated by dash dot line, e.g. in the form of a barrel or drum) surrounding the rectifier part R and stripper part S, the stripper part S comprising a plurality of cylindrically formed channel assemblies 6 positioned concentrically inside the envelope housing 17, and the rectifier part R being formed by the space between the plurality of cylindrical channel assemblies 6.

In the HIDiC, the composition of the fluid mixture flowing in the stripper part S and rectifier part R changes in the flow direction. To accommodate the changes in vapour content specifically, the cross sectional area of both the stripper part S and rectifier part R changes along the flow direction of the fluid mixture. In other words, the width of the multiple channel assemblies 6 varies along the longitudinal direction of the heat integrated distillation column. E.g. the HIDiC comprises a stripper part S and a rectifier part R with a gradual or stepwise increase and decrease, respectively in width. When using a stepwise increase/decrease, the HIDiC can be composed of several stages of the (combinations of) channel assemblies 6 as described with reference to the embodiments above. The number of layers of structured packing may increase/decrease with the width.

Each channel assembly 6 (or combination of channel assemblies 6) described with reference to the embodiments described above, may form a single processing layer. The entire HIDiC may comprise many of such processing layers parallel to each other. Also dimensions of each processing layer may be increased for scaling up the HIDiC. E.g. in a test environment, the processing layer may be 1 meter high and 20 cm wide with a heat exchanger plate distance of 15 mm, providing a capacity of 50 kg/h and a heat transfer capacity of 5 kW. An industrial application may have a capacity 1000 times as high, e.g. by providing 100 processing layers of 200 cm wide with the same heat exchanger plate distance of 15 mm. To obtain a good separation, a total height of e.g. 5-10 meters is chosen, where the stripper part S has an increasing cross section in the upward direction and the rectifier part R a decreasing cross section in the upward direction (providing a column with a constant diameter). The heat transfer capacity will then be in the order of 5-10 MW.

The embodiments described above will provide a type of HIDiC which may be called a structured HIDiC (S-HIDiC). The S-HIDiC combines the excellent heat transfer characteristics of a plate-fin heat exchanger and the separation performance of structured packing. This is a further improvement of heat integrated distillation technology leading to a reduction in column size and operating cost. It solves the limited mass transfer properties of the plate-fin HIDiC, and also simplifies the design of the distributors and collectors at the ends of the HIDiC.

The S-HIDiC as described with reference to the invention embodiments discussed above is a micro-structured separator that combines the efficient heat transfer properties of a plate-fin heat exchanger and the efficient mass transfer (separation) properties associated with structured packing. In contrast to the plate-fin HIDiC, where the focus is on heat exchange performance, in the S-HIDiC the focus is on separation (mass transfer), which is a performance limiting factor, as was shown experimentally. FIG. 6 shows a graph in which the HETP is plotted as function of an average F-factor, both for a plate-fin type of HIDiC as for a plate-packing type of HIDiC. The HETP is clearly much lower for the plate-packing type of HIDiC's, indicating an improved separation performance. A smaller HETP is desirable for distillation columns.

The channel assembly 6 in the S-HIDiC is responsible for heat transfer, separation, and low pressure drop and should be able to handle vapor velocities corresponding with F-factors in the order of 1-3 $Pa^{1/2}$ and have an acceptable turndown ratio of 2. The good separation and (re)distribution performance, associated with the channel assembly 6 in the S-HIDiC, results in a better performance in comparison to the PF-HIDiC and thus to a further reduction in column height.

The low cost S-HIDiC with its high specific heat transfer area and low pressure drop (previously typical for plate heat exchangers), leads to lower minimum approach temperatures and thus to further energy savings and expanding the temperature application range. In a case study it was shown that compared to tray HIDiC's (see e.g. U.S. Pat. No. 7,678,237) the pressure drop is substantially lower, which results in lower compressor power, which is especially beneficial for vacuum distillation process such as ethyl benzene/styrene. In FIG. 7 a graph is shown of the pressure drop as function of the F-factor for various circumstances in an S-HIDiC, which clearly shows that a low pressure drop is attainable. Heat transfer coefficients in the plate-packing HIDiC are typically 25% higher than in the plate-fin HIDiC with the same dimensions and operated under the same conditions.

It is anticipated that the S-HIDiC will not only outperform the concentric tray HIDiC in its application range, but that 60-75% energy savings will become possible in the 20-60° C. temperature lift range The minimum specific targets for the S-HIDiC are:

HETP=0.3 m (separation);

optimum F-factor=2 $Pa^{0.5}$ (capacity);

heat transfer=200 $W/m^2/K$;

pressure drop=1 mbar/stage;

turndown ratio=2 (flexibility);

investment cost comparable to conventional structured packing column.

The S-HIDiC according to the present invention embodiments leads to 60-75% energy savings for columns with a temperature lift of 20-60° C. The S-HIDiC has an improved separation efficiency compared to the PF-HIDiC leading to shorter columns and thus investment cost. In addition pressure drop goes down leading to lower compression cost. The S-HIDiC in comparison with the concentric tray HIDiC leads to smaller equipment and less complicated internals. The resulting reduction in total separation cost extends the economic application range to temperature lifts of 20-60° C.

A HIDiC according to the present invention embodiments is used, for example, as part of a complete process for several substances. E.g. it may be used for separating hydrocarbons having boiling points which are close to one another. Also other substances may be processed as mentioned in the following list, where a S-HIDiC embodiment may be applied multiple times in the entire process:

MDI (diphenyl methane diisocyanate); Ethylene oxide; Phtalic anhydride; Butene-1; Cyclohexanone; Isopropanol; Oxo-alcohols; Butadiene; Propylene oxide/styrene (PO/SM); Caprolactam; Alkylation (Refinery); Benzene; Bisphenol-A; Styrene; Propylene oxide/t-butyl alc. (PO/TBA); Gasoline/pygas hydrogenation.

An additional application is in the distillation of ethanol for bio-fuels.

The present invention embodiments have been described above with reference to a number of exemplary embodiments as shown in the drawings. Modifications and alternative implementations of some parts or elements are possible, and are included in the scope of protection as defined in the appended claims.

The invention claimed is:

1. A heat integrated distillation column for separating components in a fluid mixture, the heat integrated distillation column comprising:

a stripper part, a rectifier part and a compressor between the stripper part and the rectifier part, wherein each of the stripper part and rectifier part comprises a series of at least two corrugated plates directly contacting each other and positioned along a longitudinal direction of the heat integrated distillation column, wherein each two immediately adjacent corrugated plates have different corrugation orientations, and form a plurality of channels running from one end of the heat integrated distillation column to the other end, wherein the different corrugation orientations are symmetrical with respect to the length of the column.

2. The heat integrated distillation column of claim 1, wherein the corrugated plates have surfaces that allow condensation on the surface of the plates or allow vaporization from the surface of the plates.

3. The heat integrated distillation column of claim 1, wherein the corrugated plates have a density of less than 1500 kg/m$^3$.

4. The heat integrated distillation column of claim 1, wherein the channels flow along a length of the heat integrated distillation column.

5. The heat integrated distillation column of claim 1, wherein the channels are at an angle of more than 15° with respect to the length of the heat integrated distillation column.

6. The heat integrated distillation column of claim 1, wherein the corrugated plates comprise a material having a plurality of indentations and/or perforations.

7. The heat integrated distillation column of claim 1, wherein a contact sheet is provided between two adjacent channel assemblies.

8. The heat integrated distillation column of claim 1, further comprising an envelope housing surrounding the heat integrated distillation column.

9. The heat integrated distillation column of claim 1, wherein the width of the channels varies along the length of the stripper part and/or rectifier part.

* * * * *